Oct. 25, 1955 E. J. OTTO 2,721,484

ADJUSTABLE PITCH SHEAVE

Filed March 8, 1952

Inventor
Eugene J. Otto
by Wayne B. Easton
Attorney

United States Patent Office 2,721,484

Patented Oct. 25, 1955

2,721,484

ADJUSTABLE PITCH SHEAVE

Eugene J. Otto, Milwaukee, Wis., assignor to Allis-Chalmers Manufacturing Company, Milwaukee, Wis.

Application March 8, 1952, Serial No. 275,526

3 Claims. (Cl. 74—230.17)

This invention relates to an improvement in expansible V-belt sheaves of the type in which opposed frusto-conical surfaces are axially movable toward and away from each other to increase and decrease the effective pitch diameter of the sheave.

More specifically the invention pertains to means for adjusting the effective pitch diameter of multiple groove V-belt sheaves of the type comprising two movable sets of conical disks, each set comprising a plurality of disks in alternating relation with disks of the other set, the disks of each set being spaced adjacently to disks of the same set by rigid connecting means which pass through apertures in the intervening disks of the other set.

The general object of the invention is to provide a new and improved mechanism for adjustably varying the effective pitch diameter of multiple groove V-belt sheaves of the type in which the belt engaging parts thereof are movable symmetrically relative to the plane of the belt.

A more specific object of the invention is to provide such a mechanism which may be conveniently actuated from either side of the sheave to adjust the pitch diameter of the sheave.

Other objects and advantages will appear from the following description and drawing in which.

Figure 1:
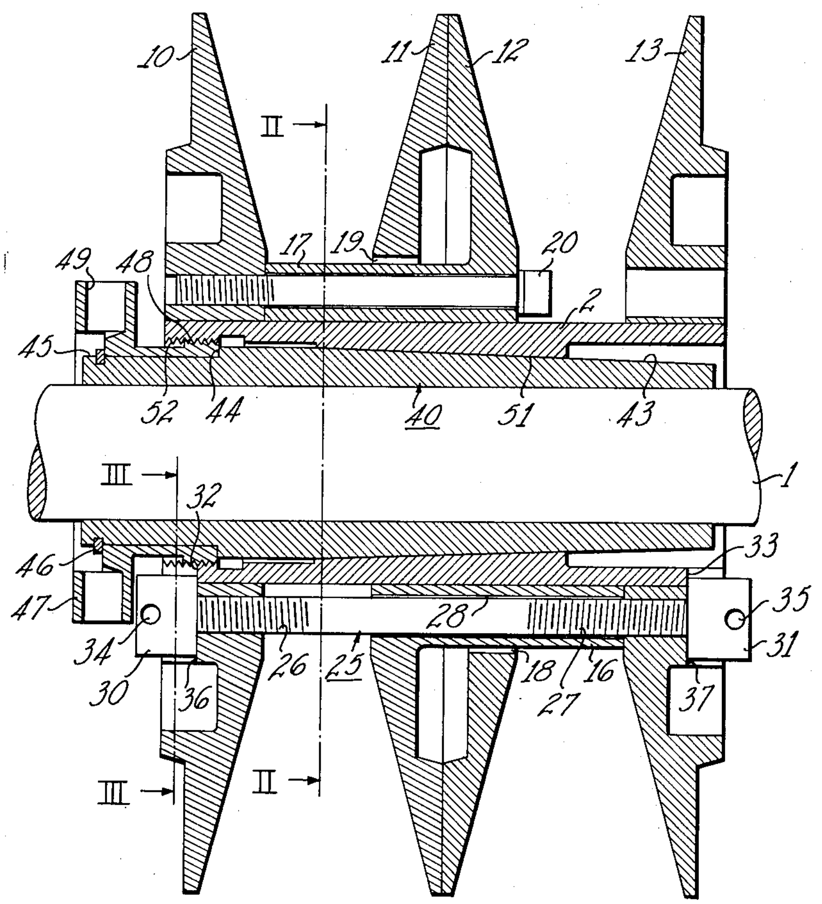
Fig. 1 is a view of a multiple groove sheave embodying the invention, shown in section on a longitudinal plane through the axis of rotation and taken on line I—I of Fig. 2.
Figure 2:
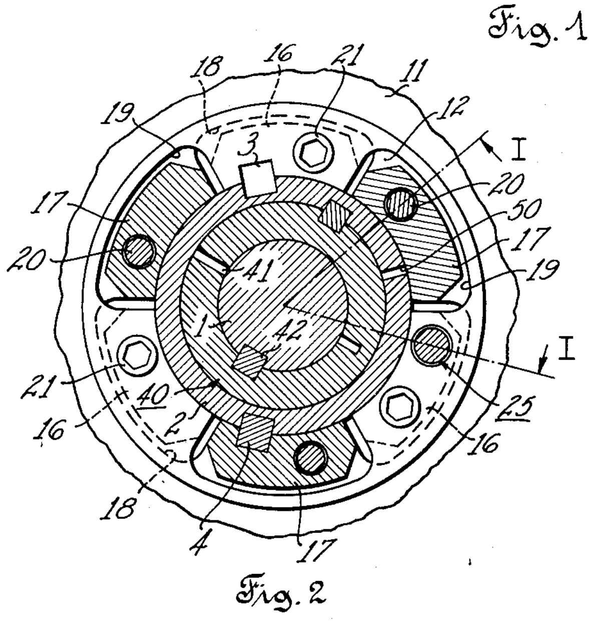
Fig. 2 is a cross sectional view taken on line II—II of Fig. 1.
Figure 3:
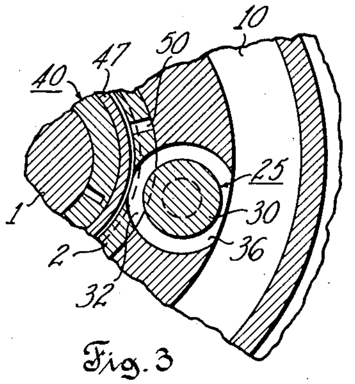
Fig. 3 is a fragmentary section taken on line III—III of Fig. 1.

The illustrated sheave is shown mounted on a drive shaft 1 which may be either a driven or driving member. The sheave has a rotary power transmission member or support member 2 adapted for attachment to rotary shaft 1 in the way illustrated in the drawing and described hereinafter or in various other ways known to those skilled in the art. Support member 2 has a generally cylindrical surface and is provided with two conventional longitudinally extending keyways in its exterior surface in which keys 3 and 4 are disposed.

On support member 2 are provided a series of annularly shaped disk members 10, 11, 12 and 13. Disk 10 is termed an end disk and is annular in form with a central opening bounded by a substantially continuous bearing surface, broken only by a conventional keyway to fit key 3. Disk 13 is an annular end disk positioned at the opposite end of support member 2 and has a central opening bounded by a substantially continuous cylindrical bearing surface broken only by a conventional keyway to fit key 4. Disks 10 and 13 have frusto-conical belt engaging faces mutually facing each other.

The scope of the invention includes a construction utilizing end disks 10 and 13 alone as well as constructions in which end disks 10 and 13 are utilized with two or more intermediate disks 11 and 12. Intermediate disks 11 and 12, also having frusto-conical belt engaging faces, are generally annular in form and are respectively axially spaced from and clamped to end disks 13 and 10 so as to form two sets of oppositely facing disks. The two sets of disks are axially movable with respect to each other and support member 2. When two ore more intermediate disks are utilized, the disks of the two sets are alternately arranged to form cooperating pairs of oppositely facing disks, the faces being movable toward and away from each other to increase and decrease the effective diameter of the pulley.

A preferred way of spacing and clamping the disks in each of the two groups is illustrated although other known ways may be utilized within the scope of the invention. Intermediate disks 11 and 12 are respectively formed with axially extending lugs 16 and 17 which are circumferentially spaced so that the lugs on each disk form an annular series. Between the respective lugs of disks 11 and 12 are openings 18 and 19 such that in assembly the set of lugs on each disk is interdigitated and passes through the openings between the set of lugs on the other disk. Suitable tie bolts 20 and 21 are passed through suitable holes in the lugs and end disk of their respective sets of disks and serve to clamp together the respective disks of each set so that the two sets are axially movable as units relative to each other and support member 2. One lug 16 has a longitudinal keyway cooperating with key 3 and one lug 17 has a longitudinal keyway cooperating with key 4, to prevent rotation of the respective sets of disks relative to support member 2.

The invention pertains particularly to new and improved means for axially moving the two sets of disks toward and away from each other to increase and decrease the effective pitch diameter of the pulley. For this purpose there is provided an actuating screw 25 having reversed or oppositely threaded sections 26 and 27 which are axially spaced from each other. Actuating screw 25 is rotatable about its own axis, which is parallel to the axis of support member 2, and is adapted for threaded engagement with both sets of disks. Disks 10 and 13 are respectively provided with threaded longitudinal bores which respectively engage the oppositely threaded sections 26 and 27 of screw 25. Intermediate disks 11 and 12 are provided with suitable openings through which screw 25 passes, such an opening 28 being shown in one of the lugs 16 of disk 11 by way of example. If desired, opening 28 could be threaded for engagement with threaded section 27 of screw 25 instead of providing a threaded bore in disk 13.

Actuating screw 25 is rotatable in either direction to effect axial movement of the two sets of disks toward and away from each other and means are provided which facilitate rotation of the actuating screw and which maintain the actuating screw in a fixed axial position relative to support member 2. For this purpose there are provided two collar members 30 and 31 which are respectively secured to opposite ends of actuating screw 25 and which respectively abut surface portions 32 and 33 formed on support member 2 at opposite ends thereof. One of the collars 30 and 31 may be integral with screw 25 or both collars may be detachably secured to the screw. Holes 34 and 35 are provided in collars 30 and 31 so that a rod (not shown) may be inserted in either hole for rotating screw 25 to effect axial movement of the two groups of disks toward and away from each other. An advantage of this arrangement is that the axial positions of the two sets of disks may be adjusted from whichever side happens to be the most convenient.

Surface portions 32 and 33 are in planes extending perpendicular to the cylindrical external surface of support member 2 and are shown in the drawing by way of example as recessed surface portions of slots formed at opposite ends of support member 2. The recessing of surface pc
ducing the a:
spect to supp
The threac
threaded sect
bored from ti
cessed seats :
internal circu
gagement witl
36 and 37 ha
pitch diamete
the overall w
When the
facing disks a
of disks 11
the drawing,
is at its sma
actuating scre
the disks an
the pulley car
eters through
as well as dis
other until t
effective pitcl
Assembly
intermediate
serting actuat
ing disk 10
side and mo
rotating scre
10 and 13,
tive disks in
bolts 20 and
posite ends c
A preferr
shaft 1 is ill
on shaft 1 is
on shaft 1
a radial plan
width to per
to tightly gr
provided wi
The outer su
portion 43,
tion 45 of r
A circumfere
portion 45 i
tween shoulc
shaped actua
same as cyli
portion 48, a
49 are borec
ing actuating
Support m
shape and be
plane as at
to permit s
clamping en
port membe
portion 51
and an inter
engages thre
tion of actu
movement o
40 so that
engagement
radially into
of disks. A
power trans
47 in the o
2 with respe
eter of the
ing screw 2
The partic
and illustrat nts
hin nt:
; a
nal
om
ier-
at
ers
ing
up-
ely
m-
ec-
an
led
of
ing
ent
mit
aid
aid
aid
ked
ans
aid g a
ur-
dic-
an-
bly
ded
av-
re-
em-
om
rew
said
ing
ons
en-
mit
to em-
and
ter-
ing
ing
ons
eof,
in
ons
tive
ging
ove-
said
ore
rew
face
said
ach
xial 915
939
951
952